United States Patent
Sugai et al.

(10) Patent No.: US 8,197,731 B2
(45) Date of Patent: Jun. 12, 2012

(54) GRANULES AND FRICTION MATERIAL, AND MANUFACTURING METHOD THEREOF

(75) Inventors: Yoshiyuki Sugai, Tokyo (JP); Hiroshi Idei, Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 737 days.

(21) Appl. No.: 12/024,135

(22) Filed: Feb. 1, 2008

(65) Prior Publication Data

US 2008/0184628 A1    Aug. 7, 2008

(30) Foreign Application Priority Data

Feb. 2, 2007    (JP) ................................ P.2007-023828

(51) Int. Cl.
*B29B 9/08* (2006.01)
*B29C 43/02* (2006.01)

(52) U.S. Cl. ............... 264/115; 264/117; 23/313 FB

(58) Field of Classification Search ............... None
See application file for complete search history.

(56) References Cited

U.S. PATENT DOCUMENTS

| | | | |
|---|---|---|---|
| 4,073,838 A * | 2/1978 | Barnickel et al. | 264/37.29 |
| 4,237,107 A | 12/1980 | Gillot et al. | |
| 4,895,733 A * | 1/1990 | Imanidis et al. | 427/8 |
| 5,433,907 A * | 7/1995 | Ogiwara et al. | 264/117 |
| 6,060,008 A * | 5/2000 | Czarnowski et al. | 264/112 |
| 2003/0003286 A1 * | 1/2003 | Gruber et al. | 428/293.4 |
| 2005/0200042 A1 * | 9/2005 | Chiba et al. | 264/109 |
| 2006/0131774 A1 * | 6/2006 | Hogenkamp et al. | 264/109 |
| 2006/0173098 A1 | 8/2006 | Tsujimoto et al. | |
| 2007/0045889 A1 * | 3/2007 | Chiba et al. | 264/109 |
| 2007/0052126 A1 * | 3/2007 | Chiba et al. | 264/109 |

FOREIGN PATENT DOCUMENTS

| | | |
|---|---|---|
| EP | 0 415 459 A2 | 3/1991 |
| EP | 0 594 172 A1 | 4/1994 |
| JP | 7-102080 | 4/1995 |
| JP | 9-194602 | 7/1997 |
| JP | 2000-81063 | 3/2000 |
| JP | 2002-97454 | 4/2002 |
| JP | 2004-261789 | 9/2004 |

OTHER PUBLICATIONS

European Search Report dated Dec. 10, 2008.
European Search Report dated Nov. 13, 2009.
Office Action in corresponding Japanese Application 2007-023828, dated Mar. 6, 2012.

* cited by examiner

*Primary Examiner* — Mary F Theisen
(74) *Attorney, Agent, or Firm* — Finnegan, Henderson, Farabow, Garrett, Dunner, L.L.P.

(57) ABSTRACT

Granules for a friction material is produced by: granulating a mixture including a friction modifying granular material and a resin binder in a fluidized bed under a presence of a liquid including a water-soluble or water-dispersible binder. The granules have a particle size of from 100 to 2000 μm, an angle of repose of 40° or less, and a compression breakage strength of 10 MPa or less. The friction material is obtained by using the granules.

6 Claims, No Drawings

GRANULES AND FRICTION MATERIAL, AND MANUFACTURING METHOD THEREOF

This application claims foreign priority from Japanese Patent Application No. 2007-023828 filed on Feb. 2, 2007, the entire contents of which are hereby incorporated by reference.

BACKGROUND OF THE INVENTION

1. Field of the Invention

The present invention relates to a process for effectively producing granules for a friction material, which can stably provide excellent quality of the friction material; the granules by the process; a process for stably producing a friction material having excellent quality by using the granules; and the friction material obtained by the process.

2. Related Art

Friction materials are used in brake pads, brake linings or clutch facings for various vehicles and industrial machines. As processes for producing the friction materials, there have generally been employed processes of obtaining friction materials with a desired shape by dry-mixing ingredients of inorganic or organic fillers, various fiber materials, friction modifiers, resin binders, and the like in a predetermined ratio, and introducing the resulting mixture of raw materials into a preliminary molding mold to compression mold, and then subjecting the preliminarily molded product to a heat-molding treatment under predetermined pressure and temperature to thereby mold into a predetermined friction material shape and, further, properly subjecting the heat-molded product to after-treatment or grinding treatment to obtain a friction material with a desired shape.

Since the mixture of raw materials of a friction material is prepared by dry-mixing various raw materials largely different from each other in size and specific gravity, the mixture is liable to suffer separation or segregation of the raw materials. Therefore, it is difficult to obtain a molded product wherein the ingredients thereof are in a uniform state. As a result, there arises a problem with respect to stability of friction properties.

The mixture of raw materials are an aggregate of raw materials different from each other in particle size distribution ranging from several micro-meters order to several hundred micro-meters order, and hence flowability or adherability of the mixture depends upon properties of respective raw materials and is unable to be controlled. Accordingly, as has been described hereinbefore, the mixture of raw materials must be subjected to preliminary molding prior to the heat molding and, as has been described hereinbefore, the mixture is introduced into a preliminary molding mold to conduct compression molding. In this preliminary molding, however, an external force is applied to the mixture introduced into the molding mold to level the surface, which is the cause of segregation and separation of the raw materials.

As a countermeasure for the problems, use of granules made by the raw material mixture can be considered. However, granules generally have spherical shapes with strong surfaces, and remaining interfaces of the granules within the resulting molded product causes reduction of strength of the resulting molded product.

As granules for a friction material, there have been disclosed, for example, granules obtained by molding a mixture of at least a first component having friction modifying function and an agglomerating agent and having a porosity of from 30 to 60% by volume. (See, for example, Patent Document 1.)

The granules are preferably produced by a fluidized bed granulating process. In this process, however, a liquid phenol resin has been used as an agglomerating agent for agglomerating the first component of a friction modifying material to form powder grains (granules), and a liquid containing a water-soluble or water-dispersible binder has not been used. [Patent Document 1] JP-A-2002-97454

SUMMARY OF THE INVENTION

One or more embodiments of the invention provide a process for effectively producing granules for a friction material, which can eliminate a preliminary molding step causing segregation or separation of raw materials, which can suppress remaining of interfaces of granules within the resulting molded produce, and which can provide a friction material having excellent quality. Moreover, one or more embodiments of the invention provide granules obtained by the process, a process for stably producing a friction material having excellent quality by using the granules, and a friction material obtained by the process.

In accordance with one or more embodiments of the invention, a method of manufacturing granules for a friction material includes a step of granulating a mixture including a friction modifying granular material and a resin binder in a fluidized bed under a presence of a liquid including a water-soluble or water-dispersible binder.

Further, the method may include a step of spraying the liquid containing the water-soluble or water-dispersible binder in the fluidized bed.

In addition, one or more embodiments of the invention provides granules for a friction material, having a particle size from 100 to 2000 μm, an angle of repose of 40° or less, and a compression breakage strength of 10 MPa or less.

Moreover, in accordance with one or more embodiments of the invention, a method of manufacturing a friction material includes steps of: granulating a mixture including a friction modifying granular material and a resin binder in a fluidized bed under a presence of a liquid including a water-soluble or water-dispersible binder to obtain granules; heat compression molding the resulting granules to obtain a heat-molded product; and heat-treating the heat-molded product.

In the method, the liquid including the water-soluble or water-dispersible binder may comprise a polyvinyl alcohol aqueous solution.

Further, the method may include a step of adjusting a content of polyvinyl alcohol in the heat-molded product in a range from 0.1 to 20% by weight, by controlling an addition amount of the polyvinyl alcohol aqueous solution fed in the fluidized bed and a concentration of polyvinyl alcohol in the polyvinyl alcohol aqueous solution.

Moreover, in accordance with one or more embodiments of the invention, a friction material is produced by steps of: heat compression molding granules for a friction material having a particle size of from 100 to 2000 μm, an angle of repose of 40° or less, and a compression breakage strength of 10 MPa or less, to obtain a heat-molded product; and heat-treating the heat-molded product.

According to the embodiments of the invention, there can be provided a process for effectively producing granules for a friction material, which can eliminate the preliminary molding step causing segregation or separation of raw materials, which can suppress remaining of interfaces of granules within the resulting molded produce, and which can provide a friction material having excellent quality.

Other aspects and advantages of the invention will be apparent from the following description and the appended claims.

DETAILED DESCRIPTION OF THE EXEMPLARY EMBODIMENTS

A process for producing granules for a friction material according to an exemplary embodiment of the invention is described below.

[Process for Producing Granules for a Friction Material]

The process of the exemplary embodiment for producing granules for a friction material includes a step of granulating a mixture containing a friction modifying granular material and a resin binder in a fluidized bed in the presence of a liquid containing a water-soluble or water-dispersible binder to obtain granules for a friction material.

<Mixture of Raw Materials>

In the process of the exemplary embodiment, a mixture of raw materials containing a friction modifying granular material and a resin binder is first prepared.

As the friction modifying granular material to be used in the mixture of raw materials, those which have conventionally been generally used as friction modifiers may be used. As such friction modifiers, for example, abrasives, lubricants, organic dusts and metals may be used.

Here, the abrasives are not particularly limited, and any one may be properly selected from among known ones having conventionally been used as abrasives. Specific examples of the abrasives include metal oxides such as iron oxide, and ceramic oxides such as alumina, silicon carbide, zirconium oxide (zirconia), zirconium silicate, magnesium oxide (magnesia), and silica. These may be used alone or in combination of two or more thereof. The content thereof to be compounded is from about 0 to about 30% by weight, preferably from 0 to 15% by weight, based on the total weight of the mixture of raw materials from the standpoint of ensuring coefficient of friction and suppressing attacking properties.

The lubricants are not particularly limited, and any one may be properly selected from among known ones having conventionally been used as lubricants for a friction material. Specific examples of the lubricant include carbon black, graphite, and metal sulfides such as molybdenum disulfide and antimony trisulfide. These may be used alone or in combination of two or more thereof. The content thereof to be compounded is from about 0 to about 30% by weight, preferably from 0 to 15% by weight, based on the total weight of the mixture of raw materials from the standpoint of maintaining lubricating power and wettability with the liquid containing the binder.

The organic dusts are not particularly limited, and any one may be properly selected from among known ones having conventionally been used as organic dusts for a friction material. Specific examples of the organic dust include dusts of rubbers such as NBR, SBR, etc. and cashew dust. These may be used alone or in combination of two or more thereof. The content thereof to be compounded is from about 0 to about 30% by weight, preferably from 0 to 15% by weight, based on the total weight of the mixture of raw materials from the standpoint of suppressing generation of gases upon fading and maintaining the effects of pores.

The metals are not particularly limited, and any one may be properly selected from among known ones having conventionally been used as metals for a friction material. Specific examples of the metal include copper, brass, zinc, and iron. These may be used alone or in combination of two or more thereof. The content thereof to be compounded is from about 0 to about 50% by weight, preferably from 0 to 25% by weight, based on the total weight of the mixture of raw materials from the standpoint of suppressing segregation in a friction material due to an increase in specific gravity of granules.

On the other hand, the resin binders are not particularly limited, and any one can be properly selected from among known ones having conventionally been used as resin binders for a friction material. Specific examples of the binder resin include powders of thermosetting resins such as phenol resin, various modified phenol resins, melamine resin, epoxy resin, and polyimide resin. These resins may be used alone or in combination of two or more thereof. Of these, phenol resin powder is preferred. The content thereof to be compounded is from about 5 to about 20% by weight, preferably from 7 to 15% by weight, based on the total weight of the mixture of raw materials from the standpoint of performance as a binder and formulation balance with other components.

In the mixture of raw materials, there can be incorporated, together with the friction modifying granular material and the resin binder described above, bulk filler such as an inorganic filler (e.g., calcium carbonate, barium sulfate or inorganic flake substance such as vermiculite or mica) and, further, an organic filler. These powders may be used alone or in combination of two or more thereof. Of these, phenol resin powder is preferred. The content thereof to be compounded is from about 0 to about 70% by weight, preferably from 0 to 50% by weight, based on the total weight of the mixture of raw materials from the standpoint that the resin binder be sufficiently distributed throughout the mixture to maintain the binding force thereof and that abnormal wear of the friction material be prevented.

In the mixture of raw materials, various short fibers of, for example, about 200 μm or shorter in length can properly be incorporated as needed within the range of not spoiling the purpose of the invention. Regarding kinds of such short fibers, proper one can be selected from among fibers to be described hereinafter. Additionally, when fibers are incorporated in the granules, flowability of the granules tends to get worse, and hence it is important to sufficiently examine the amount and the shape of the fibers.

In the mixture of raw materials, various additives such as an antioxidant, a heat stabilizer, a UV ray absorbent, a light stabilizer, a releasing agent, a colorant, and a curing agent can properly be incorporated as needed within the range of not spoiling the purpose of the invention.

Processes for preparing the mixture of raw material are not particularly limited and, for example, a process may be employed wherein individual components of the friction modifying granular material, resin binder, and other optional components to be used as needed are dry-blended in a common mixer such as a Henschel mixer or a tumbler blender.

<Liquid Containing a Water-Soluble or Water-Dispersible Binder>

In the process of the exemplary embodiment, a liquid containing a water-soluble or water-dispersible binder is used as a binder in order to granulate the mixture of raw materials in a fluidized bed.

As the water-soluble or water-dispersible binder to be contained in the binder-containing liquid, there can preferably be illustrated water-soluble or water-dispersible high molecular compounds. Specific examples thereof include polyvinyl alcohol, polyvinyl acetal, polyvinylpyrrolidone, hydroxymethyl cellulose, carboxymethyl cellulose, hydroxyethyl cellulose, hydroxypropyl cellulose, polyacrylic acid, polymethacrylic acid, sodium polyacrylate, polyvinyl acetate, polyethylene oxide, soluble starch, casein, gelatin, and sodium alginate. These may be used alone or in combination of two or more thereof. Of these, those which undergo thermal decomposition in the final-step heat treatment (about 200 to about 300° C.) are preferred, with polyvinyl alcohol being particularly preferred.

This polyvinyl alcohol shows different solubility in water depending upon the polymerization degree and saponification degree thereof. In the invention, partially saponified polyvinyl alcohol is preferred and, in particular, those polyvinyl alcohols are preferred which have a polymerization degree of from about 500 to about 3,500 and a saponification degree of from about 85% to about 92%.

The liquid containing the binder may be either in an aqueous solution state or in an aqueous emulsion state. The concentration of the water-soluble or water-dispersible binder varies depending upon kind of binders to be used. With polyvinyl alcohol, the content is usually from about 1 to about 10% by weight, preferably from 2 to 8% by weight.

In the exemplary embodiment, the mixture of raw materials prepared as described hereinbefore and the liquid containing the water-soluble or water-dispersible binder are used, and the mixture of raw materials is granulated in a fluidized bed in the presence of the liquid containing the binder to thereby produce granules for a friction material.

As a fluidized bed granulating machine to be used for the granulation, any granulating machine that forms a fluidized bed by a gas blown upward from the lower part thereof may be employed with no limitations, and any of conventionally known various fluidized bed granulating machines such as a common fluidized bed granulating machine, a circulation type fluidized bed granulating machine, a forced circulation type fluidized bed granulating machine, a jet-fluidized bed granulating machine, etc. may be employed.

As to a specific granulating process in the case of using a common fluidized bed granulating machine, powder grains of the mixture of raw materials are introduced into a vessel wherein the bottom functions as a gas-regulating board, a heated air is introduced through the gas-regulating board to bring the powder grains into a fluidized-bed state, and the liquid containing a water-soluble or water-dispersible binder is sprayed over the powder grains through a spray nozzle to thereby bind powder grains to each other in a porous state, thus granules for a friction material being formed.

In this case, porosity, particle size, etc. can be adjusted by controlling the temperature within the vessel wherein the fluidized bed is formed, the pressure within the vessel (state of the fluidized bed), the concentration and amount of the binder-containing liquid to be sprayed, the kind of the binder, the spraying pressure of the binder-containing liquid, and the like. For example, in order to raise the porosity, it suffices to relatively increase the temperature within the vessel, increase the binder concentration, decrease the spraying amount, and increase the spraying pressure whereas, in order to enlarge the particle size, it suffices to relatively decrease the temperature within the vessel, increase the binder concentration, increase the spraying amount, and decrease the spraying pressure.

According to the process of the exemplary embodiment, granules for the friction material may be obtained in the above-described manner. Details on the resulting granules for a friction material are described below.

Next, the granules of the exemplary embodiment are described below.

[Granules For a Friction Material]

The granules of the exemplary embodiment are obtained by the aforesaid process.

According to the process of the exemplary embodiment, granules having the following physical properties can be obtained. That is, the particle size of the granules is from 100 to 2000 μm in view of flowability, and the median diameter, $D_{50}$, is from about 300 to about 900 μm. Additionally, methods for measuring the particle size and the median diameter will be described hereinafter. In addition, the angle of repose of the granules measured according to JIS R9301-2-2 is 40° or less. In case when the angle of repose exceeds 40°, there results insufficient flowability, with the lower limit usually being about 15°. The angle of repose is preferably from 20 to 40°, more preferably from 20 to 35°. Further, the compression breakage strength of the granules is 10 MPa or less. In case when the compression breakage strength exceeds 10 MPa, the resulting granules become difficult to break when the granules are introduced into a heat-molding mold and heat compression molding is conducted, and thus interfaces of the granules remain, which can be the cause of reduction in the strength of the molded product. On the other hand, in case when the compression breakage strength is too small, there arise disadvantages that, for example, the granules will be broken during transportation of them or during mixing them with other components. Therefore, the lower limit of the compression breakage strength of the granules is usually about 1 MPa. The compression breakage strength of the granules is preferably from 1 to 10 MPa, more preferably from 1 to 5 MPa. Additionally, the method for measuring the compression breakage strength will be described hereinafter.

In addition, the exemplary embodiment of the invention provides granules for a friction material, the granules having the aforesaid physical properties.

The granules of the exemplary embodiments of the invention for a friction material exhibit effects shown below.

(1) The granules can simplify the process for producing a friction material owing to the high flowability thereof. For example, the granules permit short-time mixing, weighing by volume, elimination of preliminary molding, elimination of leveling of the materials within the molding mold, low-pressure and short-time molding, and elimination of compaction heating.

(2) Use of the granules serves to suppress separation or segregation of individual raw materials in the friction material, thus individual components being able to be uniformly dispersed.

(3) The porosity and pore diameter of the friction material can be controlled by changing concentration or kind of the binder-containing liquid for forming the granules.

Next, the process of the exemplary embodiment of the invention for producing a friction material, and the friction material are described below.

<Process for Producing a Friction Material, and the Friction Material>

The process of the exemplary embodiment includes steps of granulating a mixture of a friction modifying granular material and a resin binder in a fluidized bed in the presence of a liquid containing a water-soluble or water-dispersible binder to obtain granules for a friction material, heat compression molding the resulting granules to obtain a heat-molded product, and heat-treating the product.

That is, in the process of the exemplary embodiment, steps for obtaining granules for a friction material are the same as in the aforesaid process for producing granules for a friction material, and hence descriptions on the steps are omitted. In the process of the invention for producing a friction material, the granules for a friction material obtained as described above are introduced into a heat molding mold to conduct heat compression molding, and the resulting heat-molded product is further heat-treated to produce a desired friction material.

In the exemplary embodiment, it is possible to introduce, upon introduction of the granules for a friction material into a heat-molding mold to conduct heat compression molding, a mixture of the granules for a friction material and a fibrous substance into the heat-molding mold. In such case, the fibrous substance forms a skeleton in the friction material and functions to keep the skeletal structure so as not to crush pores formed in the friction material.

<Fibrous Substance>

As the fibrous substance, either of organic fibers and inorganic fibers can be used. Examples of the organic fibers include high strength aromatic polyamide fibers (e.g., aramid fibers such as "Kevlar" (trade name) manufactured by Du Pont), flame-resistant acrylic fibers, polyimide fibers, polyacrylate fibers, and polyester fibers. On the other hand, examples of the inorganic fibers include potassium inorganic fibers such as titanate potassium fibers and silicon carbide fibers; glass fibers; carbon fibers; mineral fibers such as wollastnite, sepiolite, attapulgite, halloysite, mordenite, and rockwool; ceramic fibers such as alumina silica series fibers; and metal fibers such as aluminum fibers, stainless steel fibers, copper fibers, brass fibers, and nickel fibers. These fibrous substances may be used alone or in combination of two or more thereof.

The average diameter of the fibrous substance is usually from about 0.1 to about 30 μm, preferably from 0.1 to 15 μm, in view of strength, and the average length thereof is usually from 5 to 1,000 μm, preferably from 10 to 300 μm, in view of reinforcement.

With respect to the contents of the granules for a friction material and the fibrous substance, the content of the fibrous substance is preferably from 3 to 50% by weight, more preferably from 10 to 45% by weight, based on the total weight of both from the standpoint of forming a skeleton within the friction material and suppressing crushing of pores formed within the friction material.

In the exemplary embodiment, as conditions upon introducing the granules for a friction material or the mixture of the granules for a friction material and the fibrous substance into a heat-molding mold and conducting heat compression molding, the temperature is usually from about 100 to about 250° C., preferably from about 140 to about 190° C., and the pressure is usually from about 10 to about 70 MPa, preferably from 30 to 50 MPa.

In the exemplary embodiment, a heat-molded product is obtained as described above. The content of the water-soluble or water-dispersible binder in the heat-molded product can be adjusted by controlling the addition amount of the binder-containing liquid and the concentration of the binder in the binder-containing liquid in the granulating step. When the binder is polyvinyl alcohol, the content of polyvinyl alcohol in the heat-molded product is preferably adjusted to be from 0.1 to 20% by weight, more preferably from 0.5 to 5% by weight.

As is described above, the porosity and pore diameter of the friction material can be controlled by adjusting the content of the binder in the heat-molded product.

In the invention, the heat-molded product is further heat-treated to thereby thermally decompose the water-soluble or water-dispersible binder contained therein. Thus, the binder is removed to produce a friction material having an intended porosity and an intended pore diameter. This heat treatment is conducted usually at a temperature of from about 150 to about 350° C., preferably from at 200 to 300° C., for a period of from about 0.5 to about 12 hours, preferably from 0.5 to 6 hours.

The friction material of the exemplary embodiment is obtained by the above-described process.

In addition, the exemplary embodiment also provides a friction material obtained by heat compression molding the granules having the aforesaid properties, and heat-treating the resulting heat-molded product.

The friction material of the exemplary embodiment contains uniformly dispersed components and allows the porosity and the pore diameter to be changed arbitrarily, and hence can provide more improved friction properties than those of conventional products.

EXAMPLES

Next, the invention will be described in more detail by reference to Examples which, however, are not to be construed as limiting the invention in any way.

Additionally, various properties in each Example were measured according to the following methods.

(1) Particle Size Distribution of the Granules for a Friction Material, the Median Diameter ($D_{50}$)

Measurement was conducted by means of a particle size distribution-measuring apparatus based on laser diffraction scattering method.

(2) Angle of Repose of the Granules for a Friction Material

Measurement was conducted according to JIS R9301-2-2.

(3) Compression Breakage Strength of the Granules for a Friction Material

Measurement was conducted by means of a particle hardness-measuring apparatus.

(4) Content of Polyvinyl Alcohol in the Heat-Molded Product

The content was calculated from the concentration of the binder-containing liquid and the introduction amount thereof.

(5) Porosity and Average Pore Diameter of the Friction Material

A test piece was cut out of a friction material obtained in each Example, and the porosity and the average pore diameter were measured by means of a mercury porosimeter.

(6) 3-Point Bending Strength of the Friction Material

A test piece was cut out of a friction material obtained in each Example, and a 3-point bending test was conducted by means of a tensile tester according to JIS D4311 to measure the 3-point bending strength at an ordinary temperature.

(7) Friction Coefficient after Fade of the Friction Material

A test piece was cut out of a friction material obtained in each Example, and the test was conducted by means of a test piece friction testing machine according to JASO-C406-82 to determine the first-fade average friction coefficient and the standard deviation (δ) thereof.

Examples 1 to 3

Raw materials of the kinds and amounts shown in Table 1 were dry-mixed in a high-speed stirring mixer to obtain powder grains of mixtures of the raw materials.

Subsequently, the powder grains of mixtures of the raw materials were fed to a common fluidized bed granulating machine, and an aqueous solution of polyvinyl alcohol (Gohsenol GH-17 (trade name); manufactured by Nippon Synthetic Chemical Industry Co., Ltd.) having the concentration shown in Table 2 was sprayed for granulation, thus granules for a friction material being obtained. Operating conditions of the common fluidized bed granulating machine are shown in Table 2.

Next, the granules for a friction material were introduced into a heat-molding mold, a pressure plate previously coated with an adhesive was applied thereto, and heat compression molding was conducted for 5 minutes under the conditions of 150° C. and 40 MPa to prepare a heat-molded product. This heat-molded product was heat-treated at 220° C. for 3 hours to produce a friction material. Characteristic properties of each friction material are shown in Table 4.

TABLE 1

| Kind of Raw Material | Name of Raw Material | wt % |
|---|---|---|
| Resin binder | Phenol resin | 7.0 |
| Organic dust | Rubber dust | 8.0 |
| Inorganic filler | Barium sulfate | 65.0 |
| Abrasive | Zirconia | 2.0 |
| Lubricant | Graphite | 5.0 |
| Metal | Copper | 13.0 |

TABLE 2

| | Example 1 | Example 2 | Example 3 |
|---|---|---|---|
| Temperature of fluidizing air (° C.) | 70 | 70 | 70 |
| Amount of introduced powder grains of a mixture of raw materials (g) | 800 | 800 | 800 |
| Concentration of PVA aqueous solution (% by weight) | 10 | 5 | 1 |

Comparative Examples 1 and 2

Raw materials of the kinds and the amounts shown in Table 1 were dry-mixed using a high-speed stirring type mixer to obtain powder grains of the mixture of raw materials. Subsequently, the powder grains of the mixture of the raw materials were introduced into a high-speed stirring type mixer, and water was added as a binding liquid for granulation, followed by conducting granulation. Thus, granules for a friction material were obtained.

Operating conditions of the high-speed stirring type mixer are shown in Table 3.

Next, the granules for a friction material were introduced into a heat-molding mold, a pressure plate previously coated with an adhesive was applied thereto, and heat compression molding was conducted for 5 minutes under the conditions of 150° C. and 40 MPa to prepare a heat-molded product. This heat-molded product was heat-treated at 220° C. for 3 hours to produce a friction material. Characteristic properties of each friction material are shown in Tables 4(A) and 4(B).

TABLE 3

| | Comparative Example 1 | Comparative Example 2 |
|---|---|---|
| Amount of introduced powder grains of a mixture of raw materials (g) | 800 | 800 |
| Amount of introduced binder liquid (water) (g) | 150 | 150 |
| Rotating speed of bottom blade (rpm) | 500 | 200 |
| Rotating speed of side blade (rpm) | 2000 | 1000 |

Comparative Example 3

Raw materials of the kinds and the amounts shown in the foregoing Table 1 were dry-mixed using a high-speed stirring type mixer to obtain powder grains of the mixture of raw materials. Subsequently, the powder grains of the mixture of raw materials were subjected to preliminary molding at 20 MPa for 10 seconds, and then introduced into a heat-molding mold. A pressure plate previously coated with an adhesive was applied thereto, and heat compression molding was conducted for 5 minutes under the conditions of 150° C. and 40 MPa to prepare a heat-molded product. This heat-molded product was heat-treated at 220° C. for 3 hours to produce a friction material. Characteristic properties of the friction material are shown in Tables 4(A) and 4(B).

TABLE 4(A)

| | | | Example 1 | Example 2 | Example 3 |
|---|---|---|---|---|---|
| | Median diameter (D50) (μm) | | 800 | 500 | 200 |
| | Particle | 100 μm ≧ | 0 | 0 | 0 |
| | size | more than 100 to 500 μm | 17 | 73 | 85 |
| | distribution | more than 500 to 1000 μm | 55 | 26 | 15 |
| | | more than 1000 to 2000 μm | 28 | 1 | 0 |
| | | 2000 μm < | 0 | 0 | 0 |
| | Angle of repose (° C.) | | 33 | 32 | 32 |
| | Compression breakage strength (MPa) | | 5 | 2 | 1 |
| Heat-molded product | Content of PVA (% by weight) | | 5 | 1 | 0.2 |
| Friction material | Porosity (%) | | 16 | 14 | 12 |
| | Average pore diameter (μm) | | 2 | 1 | 0.5 |
| | 3-Point bending strength (MPa) | | 18 | 20 | 19 |
| | Friction coefficient after fade | | 0.285 | 0.274 | 0.255 |
| | Friction coefficient after fade (δ) | | 0.020 | 0.007 | 0.010 |

TABLE 4(B)

|  |  | Comparative Example | | |
|---|---|---|---|---|
|  |  | 1 | 2 | 3 |
|  | Median diameter (D50) (μm) | 1200 | 2500 | 15 |
|  | Particle  100 μm ≧ | 5 | 2 | 90 |
|  | size  more than 100 to 500 μm | 15 | 13 | 10 |
|  | distribution  more than 500 to 1000 μm | 18 | 20 | 0 |
|  |   more than 1000 to 2000 μm | 40 | 23 | 0 |
|  |   2000 μm < | 22 | 42 | 0 |
|  | Angle of repose (° C.) | 43 | 41 | 65 |
|  | Compression breakage strength (MPa) | 12 | 16 | — |
| Heat-molded product | Content of PVA (% by weight) | — | — | — |
| Friction material | Porosity (%) | 12 | 13 | 12 |
|  | Average pore diameter (μm) | 0.3 | 0.3 | 0.2 |
|  | 3-Point bending strength (MPa) | 11 | 10 | 19 |
|  | Friction coefficient after fade | 0.229 | 0.223 | 0.224 |
|  | Friction coefficient after fade (δ) | 0.064 | 0.046 | 0.051 |

As can be seen from Tables 4(A) and 4(B), the friction materials of the invention (Examples 1 to 3) have a higher 3-point bending strength and a higher friction coefficient after fade, with the standard deviation being smaller, in comparison with the samples of Comparative Examples.

The granules of the invention for a friction material are obtained by granulating using a specific binder-containing liquid in a fluidized bed, and the friction material obtained by using the granules contains uniformly dispersed components, and allows to arbitrarily change the porosity and the pore diameter, thus having more improved friction properties than those of the conventional products.

It will be apparent to those skilled in the art that various modifications and variations can be made to the described exemplary embodiment and the examples of the present invention without departing from the spirit or scope of the invention. Thus, it is intended that the present invention cover all modifications and variations of this invention consistent with the scope of the appended claims and their equivalents.

What is claimed is:

1. A method of manufacturing granules for a friction material, the method comprising:
    dry-mixing a mixture including a friction modifying granular material and a resin binder;
    introducing the mixture into a vessel;
    introducing air into the vessel to bring the mixture into a fluidized-bed state;
    spraying a liquid including a water-soluble or water-dispersible binder to the mixture in the fluidized-bed state to granulate the mixture to obtain granules for the friction material having particle sizes from 100 μm to 2000 μm, an angle of repose of 40° or less, and a compression breakage strength of 10 MPa or less.

2. The method according to claim 1, wherein the friction modifying granular material includes an organic dust.

3. A method of manufacturing a friction material, the method comprising:
    dry-mixing a mixture including a friction modifying granular material and a resin binder;
    introducing the mixture into a vessel;
    introducing air into the vessel to bring the mixture into a fluidized-bed state;
    spraying a liquid including a water-soluble or water-dispersible binder to the mixture in the fluidized-bed state to granulate the mixture to obtain granules having a particle size from 100 μm to 2000 μm, an angle of repose of 40° or less, and a compression breakage strength of 10 MPa or less;
    heat compression molding the resulting granules to obtain a heat-molded product; and
    heat-treating the heat-molded product.

4. The method according to claim 3, wherein the liquid including the water-soluble or water-dispersible binder comprises a polyvinyl alcohol aqueous solution.

5. The method according to claim 4, further comprising:
    adjusting a content of polyvinyl alcohol in the heat-molded product in a range from 0.1 to 20% by weight, by controlling an addition amount of the polyvinyl alcohol aqueous solution fed in the fluidized bed and a concentration of polyvinyl alcohol in the polyvinyl alcohol aqueous solution.

6. The method according to claim 3, wherein the friction modifying granular material includes an organic dust.

* * * * *